(12) United States Patent
Klebanov et al.

(10) Patent No.: US 9,117,272 B2
(45) Date of Patent: Aug. 25, 2015

(54) METHOD AND DEVICE FOR DETERMINING A CHANGE IN THE PITCH ANGLE OF A CAMERA OF A VEHICLE

(75) Inventors: Boris Klebanov, Berlin (DE); Ingo Hoffmann, Berlin (DE)

(73) Assignee: Hella KGaA Hueck & Co., Lippstadt (DE)

( * ) Notice: Subject to any disclaimer, the term of this patent is extended or adjusted under 35 U.S.C. 154(b) by 1347 days.

(21) Appl. No.: 12/648,676

(22) Filed: Dec. 29, 2009

(65) Prior Publication Data

US 2010/0165102 A1    Jul. 1, 2010

(30) Foreign Application Priority Data

Dec. 30, 2008   (DE) .......................... 10 2008 063 328

(51) Int. Cl.
*H04N 7/18* (2006.01)
*G06K 9/00* (2006.01)
(Continued)

(52) U.S. Cl.
CPC ................ *G06T 7/004* (2013.01); *B60Q 1/115* (2013.01); *B60Q 2300/3321* (2013.01); *G06T 2207/10016* (2013.01); *G06T 2207/30244* (2013.01); *G06T 2207/30252* (2013.01)

(58) Field of Classification Search
CPC .. H04N 7/18; B60Q 1/115; B60Q 2300/3321; G06T 2207/10016
See application file for complete search history.

(56) References Cited

U.S. PATENT DOCUMENTS

| 5,777,690 A | 7/1998 | Takeda et al. |
| 6,535,114 B1 | 3/2003 | Suzuki et al. |
| 2003/0107323 A1* | 6/2003 | Stam ............................... 315/82 |

(Continued)

FOREIGN PATENT DOCUMENTS

| DE | 603 09 279 T2 | 5/2007 |
| DE | 10 2007 041 781 A1 | 3/2008 |

(Continued)

OTHER PUBLICATIONS

Feiden, "Automatische Hinderniserkennung im Fahrenden Kraftfahrzeug" ("Automatic detection of obstacles in moving motor vehicle") (dissertation), 2002, Johann Wolfgang Goethe-University at Frankfurt am Main, accessed Jan. 6, 2012 at <http://publikationen.ub.uni-frankfurt.de/files/5397/00000314.pdf>, translated using Google Translate.*

(Continued)

*Primary Examiner* — Dave Czekaj
*Assistant Examiner* — Tsion B Owens
(74) *Attorney, Agent, or Firm* — Young Basile Hanlon & MacFarlane P.C.

(57) ABSTRACT

A method and device determine the change in pitch angle of a camera of a vehicle. At least three images, each reproducing a detection area in front of the vehicle, are sequentially recorded and corresponding image data are generated. A position of a first reproduction of a stationary object in the first image is determined as a first image position. A position of a second reproduction of the stationary object in the second image is determined as a second image position. On the basis of at least the first image position and the second image position, the course of a straight line is determined. A position of a third reproduction of the stationary object in the third image is determined as a third image position. On the basis of the distance between the third image position and the straight line, the change in the pitch angle is determined.

20 Claims, 13 Drawing Sheets

(51) Int. Cl.
*G06T 7/00* (2006.01)
*B60Q 1/115* (2006.01)

(56) References Cited

U.S. PATENT DOCUMENTS

| | | | |
|---|---|---|---|
| 2004/0178738 | A1 | 9/2004 | Brun et al. |
| 2008/0062010 | A1 | 3/2008 | Kobayashi et al. |
| 2008/0144924 | A1* | 6/2008 | Hoffmann ............ 382/154 |
| 2009/0067675 | A1* | 3/2009 | Tan et al. ............ 382/104 |

FOREIGN PATENT DOCUMENTS

| | | |
|---|---|---|
| EP | 0 642 950 B1 | 2/1997 |
| EP | 1 437 259 A1 | 7/2004 |
| EP | 1 837 803 A2 | 9/2007 |
| WO | 2006/069978 A2 | 7/2006 |

OTHER PUBLICATIONS

Klappstein et al., "Applying Kalman Filtering to Road Homography Estimation", ICRA 2007 Workshop: Planning, Perception and Navigation for Intelligent Vehicles, Rome, Italy, accessed May 7, 2012 at <http://www2.isr.uc.pt/~urbano/WorkICRA07/papers/ICRA07-WPPNIV-PO4.pdf>.*

Klappstein, "Optical-Flow Based Detection of Moving Objects in Traffic Scenes" (dissertation), Ruprecht Karl University of Heidelberg, Germany, Jul. 28, 2008.*

* cited by examiner

METHOD AND DEVICE FOR DETERMINING A CHANGE IN THE PITCH ANGLE OF A CAMERA OF A VEHICLE

CROSS-REFERENCE TO RELATED APPLICATIONS

This application claims priority to German Patent Application No. 10 2008 063 328.3, filed Dec. 30, 2008, which is incorporated herein in its entirety by reference.

FIELD OF THE INVENTION

The invention relates to a method for determining the change in the pitch angle of a camera of a vehicle, in particular a road vehicle. At least three images are recorded, each of which with a reproduction of a detection area in front of the vehicle, and image data corresponding to the images are generated.

BACKGROUND

Vehicles which have camera-based driver assistance systems are known. Such vehicles have at least one camera system having at least one camera which records images with reproductions of a detection area, preferably a detection area in the direction of travel in front of the vehicle, and generates image data corresponding to the images. The generated image data are then processed with the aid of suitable processing routines. For processing the image data preferably digital signal processors are used in the vehicle. In this connection, it is known to detect various objects in individual images and to compare the position of an object in various images to one another. In particular, the objects are tracked over several images. For this purpose, in particular so-called tracking methods are used.

In addition to so-called lane keeping assistants, a camera-based monitoring of the dead angle and a camera-based traffic sign recognition, also camera-based driver assistance systems for controlling the light output of the head lights of vehicles are known. It is the object of these camera-based assistance systems for the control of the light output of the headlights of the vehicle to achieve a maximized illumination of the area in front of the vehicle, without shining towards and hence hindering other road users, in particular road users in cars driving ahead or in oncoming cars. To this end, the driver assistance system evaluates further vehicle data such as the speed of the vehicle and the steer angle of the vehicle in addition to the determined image data. The driver assistance system preferably receives this further information with the aid of data transferred via a vehicle bus of the vehicle.

A change in the pitch angle of the vehicle results in that the angle of the light emitted by the headlights of the vehicle with respect to the horizontal likewise changes. A permanent change in the pitch angle, for example by an increase in the load in the rear or in the front area of the vehicle can be compensated for by known headlight range regulation systems. The abrupt change in the pitch angle in the dynamic and high dynamic range, in particular as a result of an unevenness of the road surface and the speed at which the vehicle drives on the road, results in that the area in front of the vehicle is not optimally illuminated, i.e. not in a maximized way and/or that other road users are affected by the light emitted by the headlights.

A conceivable solution is to reduce the light output of the headlights so far that given changes in the pitch angle of the vehicle within the usual range other road users are not impaired. However, this defensive control strategy of the headlights has the disadvantage that then the area in front of the vehicle is not illuminated in a maximized way.

The cameras of camera systems of the driver assistance systems integrated in known vehicles have, at least during the travel of the vehicle, a position that is known and can be assumed as being constant relative to the vehicle and hence relative to the vehicle coordinate system so that given a change in the pitch angle of the vehicle a change in the pitch angle of the camera likewise occurs.

From the document EP 1 437 259 A1, a device and a method for setting the pitch of a vehicle headlight are known, in which a specific point of light is generated and detected. Dependent on the determined position of the point of light, a setting of the pitch of the headlight is performed.

From the document DE 10 2007 041 781 A1, a device and a method for recognizing vehicles by the identification of points of light in recorded images are known. Here, it is verified whether a point of light originates from a vehicle or not.

From the document EP 642950 B1, an automatic headlight adjustment control is known, in which based on the detection of the own light distribution a headlight range regulation is performed.

BRIEF SUMMARY

It is the object of the invention to specify a method and a device for determining the change in the pitch angle of a camera of a vehicle, in which the change in the pitch angle can be reliably determined in an easy manner.

This object is solved by a method having the features of current claim 1 and by a device having the features of the independent device claim. Advantageous developments of the invention are specified in the dependent claims.

By a method for determining a change in the pitch angle of a camera of a vehicle having the features of claim 1, as well as by a device having the features of the independent device claim it is achieved that with the aid of at least two recorded images the course of a straight line is determined. The image position of the reproduction of the object in a third image and the distance between this determined image position and the straight line is determined. The determined distance is used to determine the change in the pitch angle. As a result thereof, the pitch motion of the camera and hence the pitch motion of the vehicle can be easily determined given a camera which is fixedly connected to the vehicle. This determination of the change in the pitch angle is possible both in the dynamic range and in the high dynamic range. In particular, the change in the pitch angle from one image to the next image can also be determined given image recording frequencies of 10 to 50 images per second.

Preferably, the straight line runs through the vanishing point of the image. The vehicle moves towards the object during the image recording of the sequentially recorded images. The straight line can also be referred to as epipolar line, wherein given a straightforward motion of the vehicle, each of the epipoles is preferably located in the image center of the recorded images so that the epipolar lines extend radially outwardly from stationary objects starting out from the image center, i.e. starting out from the vanishing point.

In an advantageous development of the invention, at least a fourth image with the reproduction of the detection area in front of the vehicle is recorded after recording the second image and before recording the third image, and image data corresponding to the at least fourth image are generated and processed. During processing of the image data, a fourth reproduction of the stationary object in the fourth image and its image position in the fourth image are determined as a fourth image position. Further, the course of the straight line is determined on the basis of the first image position, the second image position and at least the fourth image position. As already mentioned, the straight line can also be indicated by an epipolar line.

Further, it is advantageous to determine the course of a new straight line on the basis of the first image position, at least the second image position and the third image position. After recording the third image, at least a fifth image with a reproduction of the detection area in front of the vehicle is recorded, and image data corresponding to the at least fifth image are generated. These image data are processed in that in the fifth image a fifth reproduction of the stationary object and its image position in the fifth image are determined as a fifth image position. On the basis of the distance between the fifth image position and the determined new straight line, a further change in the pitch angle of the camera is determined. As a result thereof it is achieved that all recorded images can be used for determining the straight line, also those for which a change in the pitch angle with respect to previously recorded images has already been determined. If the straight line is determined taking into account the determined image positions of the reproductions of the stationary object in a plurality of images, then—as a result of the statistical distribution—the straight line corresponds to a straight line without a change in the pitch angle, i.e. with a preset pitch angle of the camera relative to the vehicle and relative to the coordinate system of the vehicle.

Preferably, a course of the straight line that is approximated to the determined image positions is determined, i.e. the straight line is placed through the determined image positions so that all image positions determined for the determination of the straight line lie as close to the straight line as possible. Alternatively or additionally, the straight line can run through at least one of the determined image positions. As an image position of an object serves in particular a determined image point coordinate in x-direction and y-direction of an x-y-image point matrix of an image recording sensor of the camera. If the object is imaged onto several image point recording areas, one image point recording area can be chosen and its position be used for further processing. In particular, an image point recording area in the center of the object reproduction is used as an image position for further processing.

The straight line can also be determined with the aid of a displacement vector of the image positions between at least two images. It is particularly advantageous to determine one displacement vector each of the image positions of the reproductions of the object each time between the images of at least two image pairs. The image pairs each comprise two sequentially recorded images. Based on the determined displacement vectors, an averaged displacement vector can be determined. The first image pair preferably comprises the first and the second image, and the second image pair preferably comprises the second image and a fourth image recorded between the second and the third images.

From a displacement vector or from the averaged displacement vector, a straight line equation of the straight lines can easily be determined. The averaging of the displacement vectors is likewise relatively easily possible with little resources. As a result thereof, a course of the straight line approximated to the determined image positions can be easily determined. In addition, a further displacement vector between the image positions of the reproductions of the object between the second and the third image position or, respectively, between the fourth and the third image position can be determined. The change in the pitch angle can then easily be determined by the angle between the further displacement vector and the straight line.

Further, it is advantageous to determine the reproductions of at least two stationary objects in the first and in every of the other recorded images, as well as their image positions in the respective image. Dependent on the image position of the reproductions of the objects in the respective image, a structure of the image positions in the image, preferably as a straight line or as a function, is determined. The function can, for example, be determined with the aid of a polynomial of nth order or as a Fourier transformation. In doing so, at least one displacement vector between the courses of the image positions of least two images can be determined. Based on the at least one displacement vector, the straight line is then determined. As a result thereof, the straight line can also be determined on the basis of several determined stationary objects. Furthermore, it is advantageous to determine the change in the pitch angle with the aid of the determined distance between the third image position and the straight line in the direction of the y-axis of an x-y-image point matrix of an image recording sensor of the camera 17. The x-axis of the image point matrix runs parallel to the y-axis of the vehicle coordinate system, i.e. transversely to the direction of travel in a parallel plane relative to the road surface. Alternatively, the x-axis of the image point matrix can run in a preset angle relative to the y-axis of the vehicle coordinate system.

The change in the pitch angle $\alpha$ can, in particular, be calculated according to the following equation:

$$\tan \Delta\alpha = a/b, \text{ wherein}$$

a is the distance between the third image position and the determined straight line, and
b is the distance between the image plane and the image-side principal point of the camera optical system.

The image plane is formed by the image recording area of the image recording sensor, or the image recording area of the image recording sensor is arranged in the image plane of the optical system of the camera. The distance b is also referred to as image distance. The principal point of the camera optical system preferably lies in the lens of the camera optical system facing the image recording sensor, wherein the camera optical system preferably comprises the camera lenses.

It is particularly advantageous to determine the steer angle of the vehicle between the sequential image recording of at least two images and to take into account at least one of the images in the processing of the image data. In particular, a correction of the determined image position of the reproduction of the object can be performed with the aid of the determined steer angle. As a result thereof, a determination of the pitch angle independent of a steer motion of the vehicle is possible so that the change in the pitch angle can be correctly determined in a simple manner. Otherwise, the pitch angle could only be reliably determined given a straightforward travel of the vehicle.

Based on the determined change in the pitch angle of the camera, a light distribution that is to be set for at least one headlight of the vehicle can be determined and defined. Alternatively or additionally, a correction value for the correction of the light distribution of the headlights of the vehicle can be determined. As a result thereof, an optimum, i.e. maximized, illumination of the area in front of the vehicle can be achieved without other road users being hindered even if a pitch motion of the vehicle occurs.

It is particularly advantageous to determine a light distribution that is to be set for the headlights of the vehicle on the basis of the determined change in the pitch angle of the camera. Alternatively or additionally, a correction value for the correction of the light distribution generated by the headlights of the vehicle can be determined. If the vehicle only has one headlight or if only one headlight is used for the illumination of the area in front of the vehicle, then a light distribution of the one headlight is set which corresponds to the determined pitch angle or, respectively, the determined change in the pitch angle. If several headlights are present and these are used for the illumination of the area in front of the vehicle, a new total light distribution to be set or, respectively, a correction value of the total light distribution can be determined. Alternatively, also when using several headlights, the individual light distribution to be set for each headlight can be determined or, respectively, one correction value for the correction of the light distribution of each headlight of the vehicle can be determined.

For the image recording of the images, a monocular camera, preferably a black-and-white camera for recording gray scale images is used. The amount of data to be processed given a black-and-white-camera is smaller than given corresponding color images so that the use of a black-and-white camera is sufficiently accurate and reduces the processing expense for processing the image data.

It is particularly advantageous when a stationary light source is used as a stationary object. Such a stationary light source is, for example, a light source of a street light, a light source of a traffic signal facility, a light source of a traffic sign illumination, a stationary object illuminated by a stationary light source and reflecting at least part of the light of the light source, such as a billboard. Further, traffic signs or traffic management systems can be used as stationary objects. When in a first step a reproduction of a light source is detected in a recorded image, then it can be checked in a second step whether the light source is a stationary light source. This check can in particular be made during the classification of the light source or, respectively, of the object to be detected. In this connection, it can be checked whether the light source has brightness fluctuations as a result of an energy supply by a power grid with a power frequency of 50 Hz or 60 Hz. If the light source shows such brightness fluctuations, it can be assumed that the light source is a stationary light source so that the position of the light source can be considered as being stationary. Preferably by taking further classification features into account, the light source can be classified as a stationary object. A detection possibility for detecting whether a detected light source has brightness fluctuations as a result of an energy supply by a power grid having a power frequency of 50 Hz or 60 Hz, is known, for example, from the document WO2006/0069978A2. The procedure described therein for the detection of the brightness fluctuations as a result of the energy supply by a power grid having a power frequency of 50 Hz or 60 Hz is hereby incorporated into the present specification by reference. It is particularly advantageous when the vehicle performs a travel motion during the sequential recording of the at least three images.

The device specified by the independent device claim can be developed in the same manner as the inventive method. In particular, the device can be developed with the features specified in the claims dependent on the method or, respectively, with corresponding device features.

Further features and advantages of the invention result from the following description which in connection with the enclosed drawing figures explains the invention in more detail with reference to embodiments.

BRIEF DESCRIPTION OF THE DRAWINGS

The description herein makes reference to the accompanying drawings wherein like reference numerals refer to like parts throughout the several views. The drawings are as described below.

DETAILED DESCRIPTION OF EMBODIMENTS OF THE INVENTION

Figure 1:
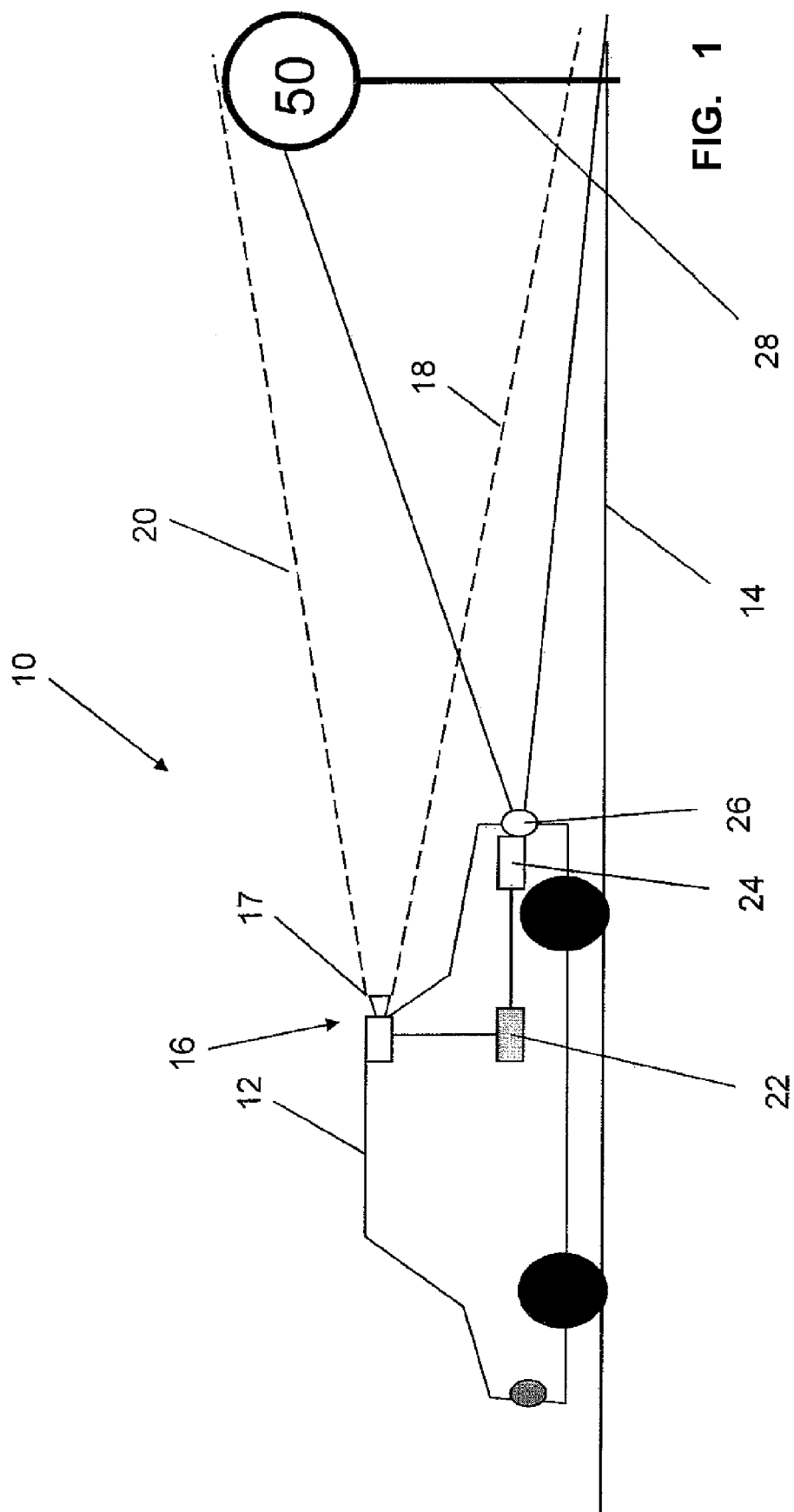
FIG. 1 is a schematic illustration of a vehicle in a traffic situation in a side view, wherein the vehicle has a device for recording and processing images.

In FIG. 1, a side view of a vehicle 12 in a traffic situation 10 during the travel of the vehicle 12 along a road 14 is illustrated. The vehicle 12 has a camera system 16 with at least one camera 17. In the present embodiment, the camera system 16 is a mono-camera system and a black-and-white camera system for determining gray scale images. The camera system 16 records an image sequence of images with reproductions of a detection area in front of the vehicle 12. The horizontal detection area is schematically illustrated by the broken lines 18, 20 in FIG. 1. Further, image data corresponding to the images are generated. The generated image data are transferred from the camera system 16 to a processing unit 22 arranged in the vehicle 12 and are processed thereby. In particular, the image data are processed in the processing unit 22 in order to provide a driving assistance system for the driver of the vehicle 12. Per second, preferably 10 to 50 images are sequentially recorded by the camera 17 of the camera system 16 and processed.

The image data of an object 28 which are generated by the camera system 16 are processed by the processing unit 22, wherein the reproduction of the object 28 is detected as an object reproduction or, respectively, as an object and preferably the object type of the object 28 is classified. In the same manner, traffic signs, traffic management systems, street lights, vehicles driving ahead on the lane and vehicles approaching on the oncoming lane of the road 14 can be detected as objects and their object type can be classified. In particular, the position of the reproductions of the objects 28 detected in an image is determined and compared with the position of the reproductions of the same objects 28 in a next image of the image sequence. For reasons of simplicity, the position of a reproduction of an object in an image is briefly referred to in the following as position of the object in the image or image position of the object. The comparison between the position of objects 28 in one image and a second image recorded after this image is, for example, used in order to influence the driving behavior and/or in order to be able to provide the driver of the vehicle 12 with specific information on the surrounding environment and on the own vehicle 12. This information can, for example, also serve as input data for driver assistance systems, traffic sign recognition systems, object tracking routines and/or light assistance systems.

A change in the position of the camera system 16 between the point in time of the recording of the first image with the aid of the camera 17 of the camera system 16 and the point in time of the recording of the second image with the aid of the camera 17 must be determined and used as an input variable for a driver assistance system for the automatic or semi-automatic control of the light output of the headlights 26 of the vehicle 12.

Changes of the position of the camera system 16 that have not been taken into account can result in that the headlights 26 are controlled by a light control module 24 such that the traffic area in front of the vehicle 12 is not optimally illuminated. Thus, other road users can, for example, have light directed towards them.

A change in the position of the camera system 16 can, for example, be caused by proper motions of the vehicle and road unevenness. What is understood by a change in the position of the camera system 16 with respect to the surrounding of the vehicle 12 is every change of the way in which the camera system 16 is located in the space. This comprises the position of the camera system 16 and the orientation of the camera 17 of the camera system 16 relative to the surrounding of the vehicle 12. Given a corresponding high-dynamic processing of the image data, a determined change in the position of the camera system 16 suggests a pitch motion or, respectively, a change in the pitch angle of the vehicle 12. The change in the pitch angle of the vehicle 12 can be taken into account in the control of the headlights 26.

As a change in the position of the camera system 16, in particular changes in the pitch angle are determined. The respective position of the optical axis of the camera 17 of the camera system 16 is usually referenced to a vehicle-fixed coordinate system, for example, a vehicle coordinate system or a camera coordinate system. Based on such a vehicle-fixed coordinate system, the position of the optical axis of the camera 17 with respect to a world coordinate system can be determined. The vehicle coordinate system is a rectangular coordinate system with a coordinate origin preferably in the center of gravity of the vehicle 12 or in the middle of the front axle of the vehicle 12 on the road 14 so that the x-axis is directed to the front and is preferably horizontal and is located in the vehicle longitudinal plane. The y-axis is perpendicular to the vehicle longitudinal center plane and is directed to the left, as viewed in the direction of travel. The z-axis is directed upwards. With respect to a camera coordinate system which has the same orientation as the vehicle coordinate system except that the coordinate origin is located on the optical axis of the camera within the camera, the pitch angle of a camera is an angle which results from a rotation about the y-axis.

Figure 2:
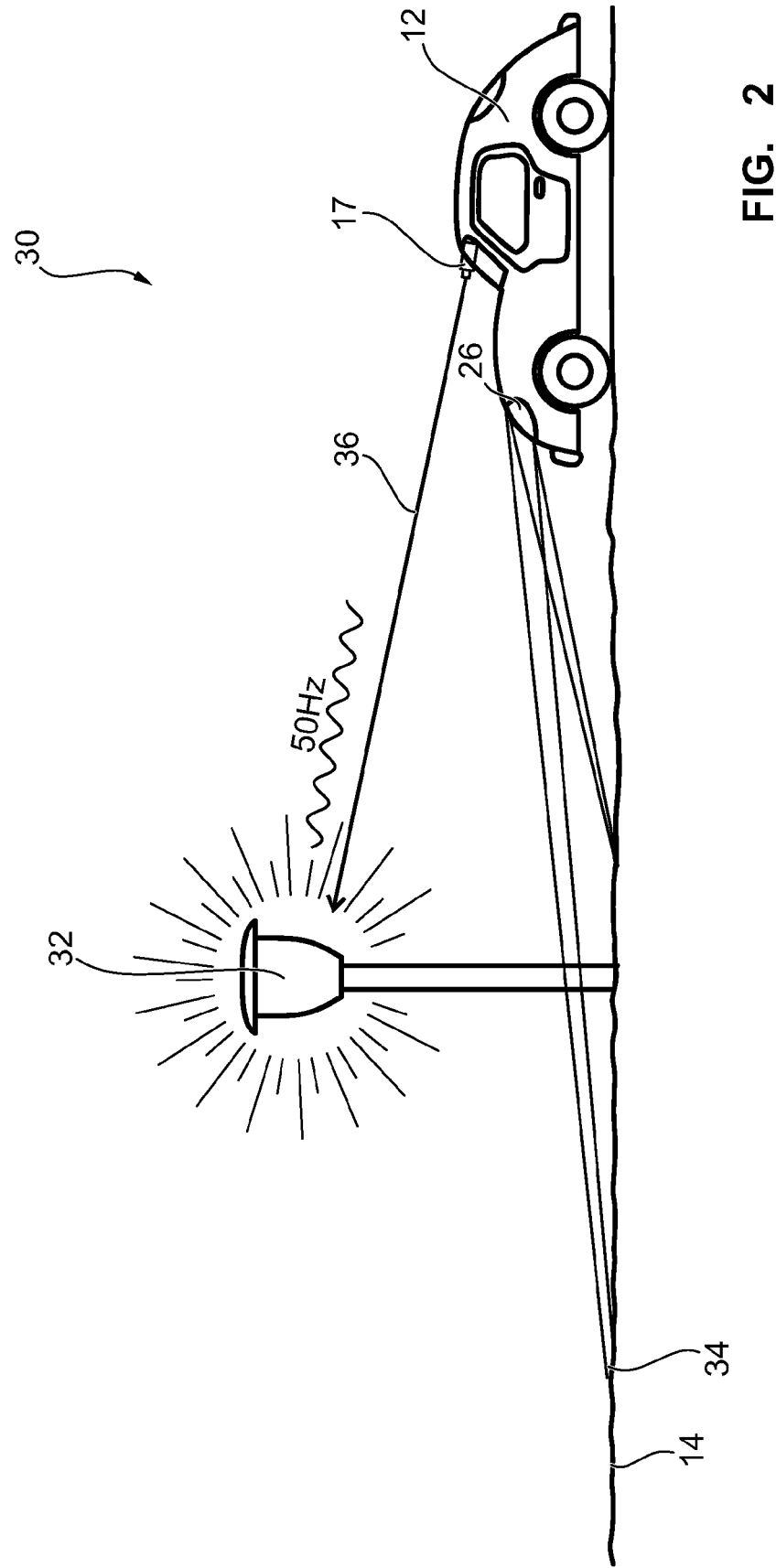
FIG. 2 is a schematic illustration of the vehicle according to FIG. 1 in a further traffic situation in a side view.

FIG. 2 shows a side view of the vehicle 12 in another traffic situation 30 during the travel of the vehicle 12 along the road 14. Elements having the same structure or same function have the same reference sign.

The vehicle 12 has the camera system 16 described in connection with FIG. 1. In contrast to the first traffic situation according to FIG. 1, a stationary object 32 in the form of a street light which is connected to a power grid of 50 Hz for an energy supply of the lamp of the street light is located in the detection area of the camera 17. As a result of the energy supply with a 50 Hz alternating voltage, the light emitted by the street light 32 has brightness fluctuations which are caused by the energy supply with a 50 Hz alternating voltage. These brightness fluctuations can be detected by means of a suitable evaluation of the images recorded with the aid of the camera 17. This evaluation is described in detail in the document WO 2006/0069978 A2. The description of the detection of stationary light-emitting objects in WO 2006/0069978 A2 is hereby incorporated into the present specification by reference.

If it has been detected that the street light 32 is connected to an energy supply having a 50 Hz alternating voltage, it can be assumed that the light source, i.e. the street light 32, is stationary. A light/dark boundary generated by the emitted light of the headlights 26 of the vehicle 12 on the road 14 has the reference sign 34. The light/dark boundary 34 indicates the boundary of the illuminated area in front of the vehicle in the direction of travel downstream of the vehicle 12.

Figure 3:
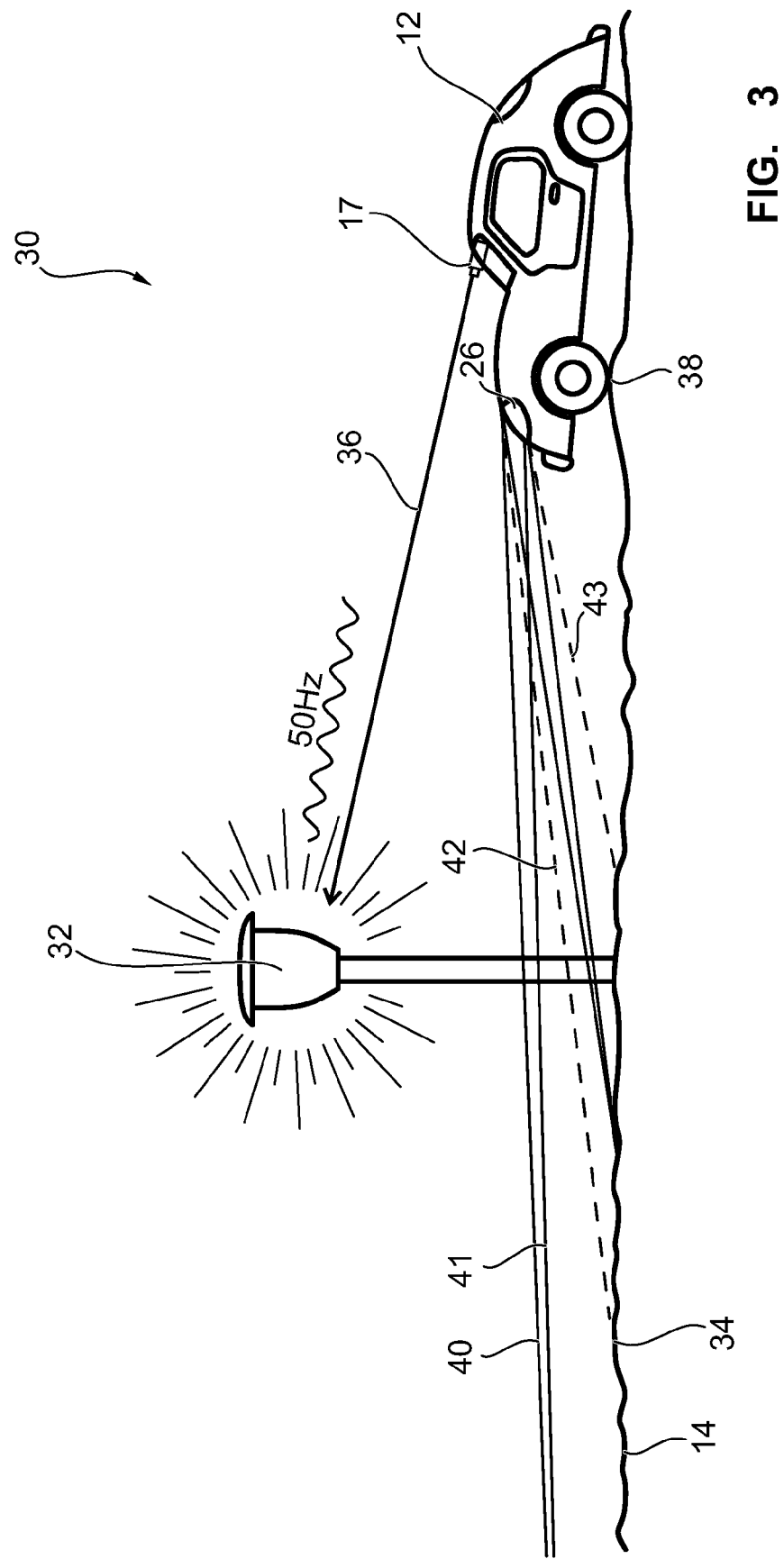
FIG. 3 shows the traffic situation according to FIG. 2, wherein the vehicle shows a change in the pitch angle compared to FIG. 2 as a result of an unevenness of the road surface.

In FIG. 3, the traffic situation 30 according to FIG. 2 is illustrated, wherein the front axle of the vehicle 12 is lifted with respect to the illustration according to FIG. 2 as a result of road unevenness 38, whereas the rear axle is not lifted. This results in a change of the pitch angle of the vehicle 12, and the light beams emitted by the headlights 26 are lifted in the embodiment illustrated by the change in the pitch angle so that the actual light/dark boundary is no longer incident on the road 14 in the image detail of the traffic situation 30 illustrated in FIG. 3 without a correction of the light distribution of the headlights 26. The desired position of the light/dark boundary given an optimal illumination of the area in front of the vehicle 12 is identified by the reference sign 34' in FIG. 3. The upper light beams emitted by the headlights 26 are identified by the reference sign 40, 41 in FIG. 3.

The light beams of the headlights 26 of the actual illumination are illustrated with continuous lines, and the light beams of the optimal light distribution are illustrated with broken lines 42, 43. The visible line of the camera 17 to the stationary object 32 is identified with the reference sign 36 in FIGS. 2 and 3. As can be taken from FIGS. 2 and 3, the change in the pitch angle of the vehicle 12 is to be detected in order to allow for an optimal light output of the headlights 26 of the vehicle 12, and in particular the hindrance of other road users possibly caused by the increase in the range of the headlights 26 is to be avoided. However, it is also desirable to detect a change in the pitch angle which effects a reduction in the headlight range of the illumination of the area in front of the vehicle 12 caused by the headlights 26, i.e. a shift of the light/dark boundary towards the vehicle 12. Such a change in the pitch angle particularly occurs when the rear axle of the vehicle 12 is arranged above a road unevenness 38 and the rear area of the vehicle 12 is thus lifted, whereas the front axle of the vehicle 12 is arranged on the normal level of the road 14 or in a depression of the road 14.

Figure 4:
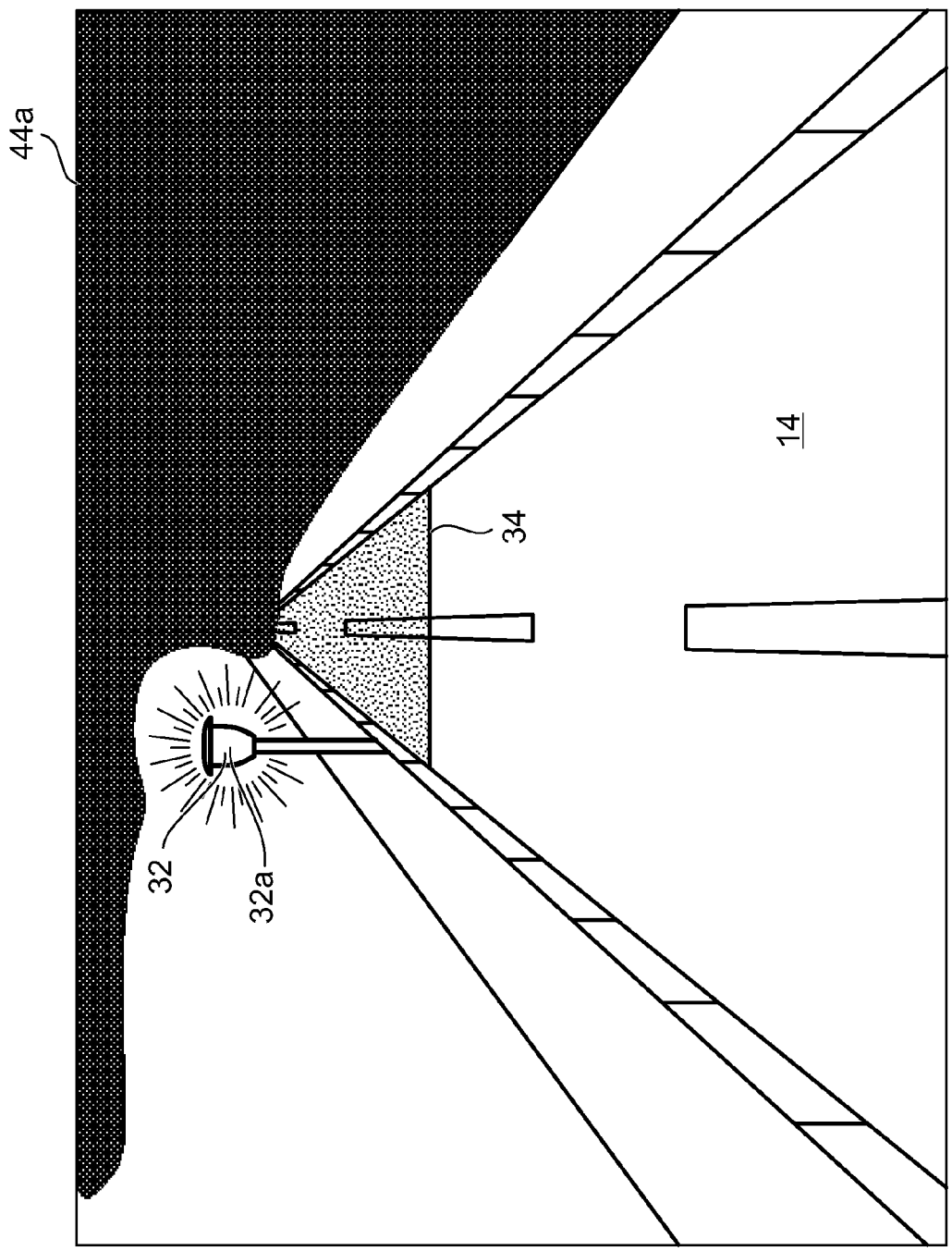
FIG. 4 shows a reproduction of a first image recorded with the aid of a camera of the vehicle.

In FIG. 4, a first image 44a with a reproduction of the detection area of the camera 17 in front of the vehicle 12 is shown. In the image 44a, a reproduction of the stationary object 32 is arranged on the left edge of the lane. The light/dark boundary 34 caused by the light output of the headlights 26 of the vehicle 12 on the road 14 is schematically illustrated in the image 44a by a transversal line. The actual light/dark boundary can have a course deviating therefrom, in particular an uneven distribution on the lanes and the lane edges.

In a further processing of the image data of the image 44a, the reproduction of the object 32 is detected and its image position 32a in the image 44a is determined. After recording the image 44a, the images 44b and 44c shown in FIGS. 5 and 6 have been recorded with the aid of the camera 17, while the vehicle 12 continues to travel in the direction of travel so that without a change in the pitch angle of the vehicle 12 or the camera 17 the image positions 32b, 32c of the reproductions of the stationary object 32 in the images 44a, 44b and 44c lie on a vanishing point beam or, respectively, on a straight line through the vanishing point of the image 44a or, respectively, through the vanishing points of the images 44a, 44b and 44c. The straight line runs from the vanishing point to the left edge of the image.

Figure 5:
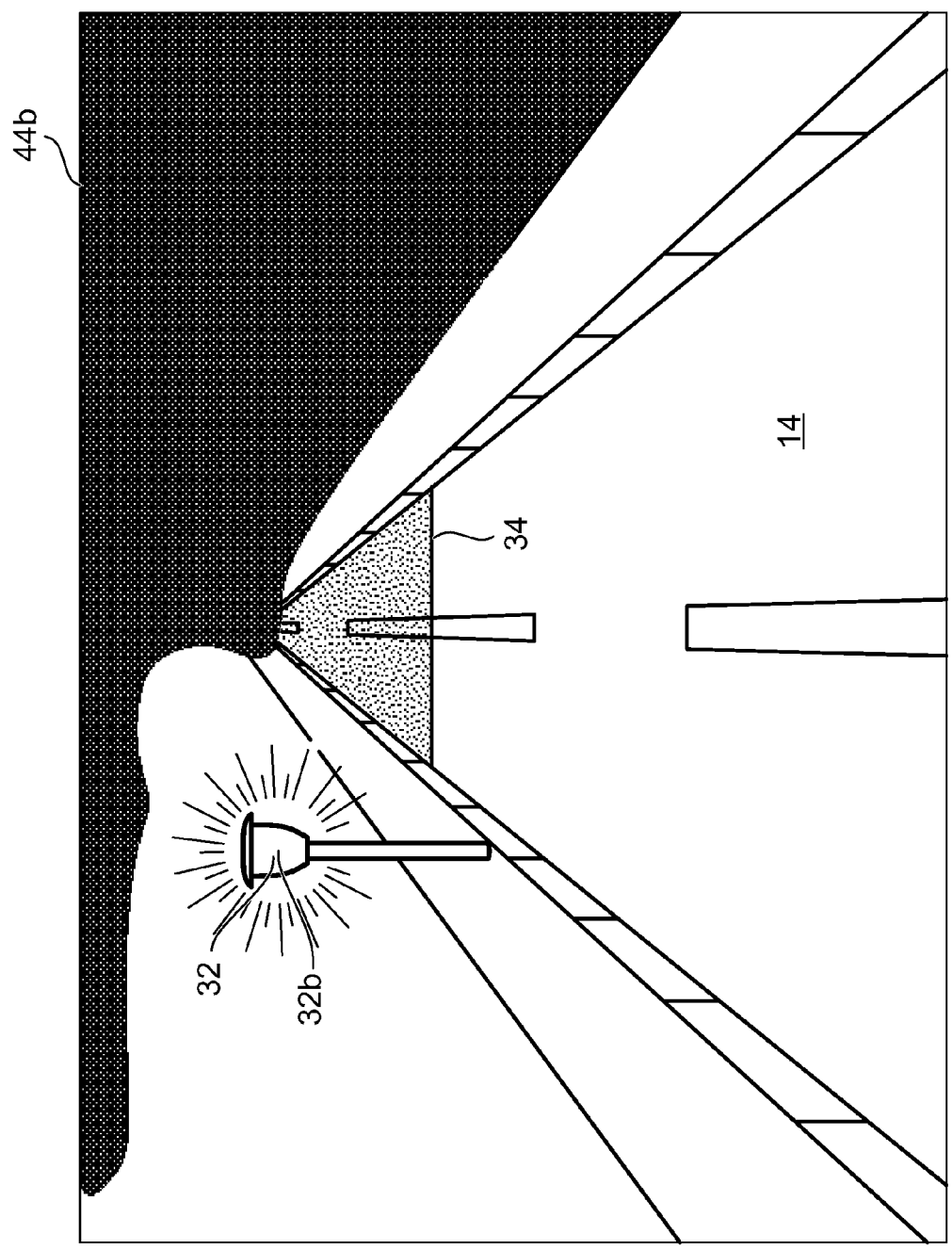
FIG. 5 shows the reproduction of a second image recorded with the aid of the camera of the vehicle.

The image 44b illustrated in FIG. 5 shows a reproduction of the object 32 at another image position since the vehicle 12 with the camera 17 has moved towards the object 32 between the recording of the image 44a and the image 44b. The image position of the object 32 in the image 44b is identified by the reference sign 32b.

Figure 6:
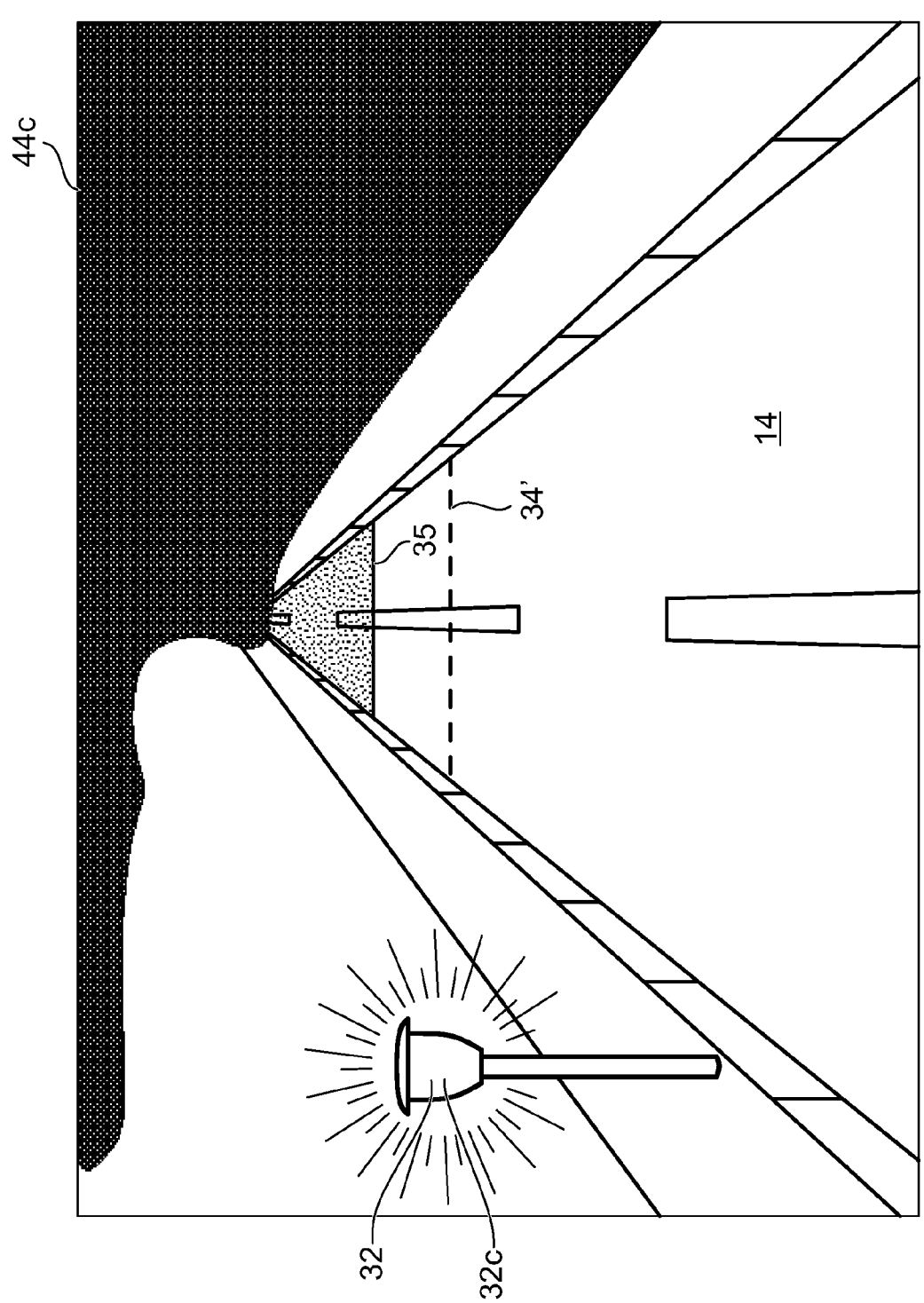
FIG. 6 shows a reproduction of a third image recorded with the aid of the camera of the vehicle.

The image 44c illustrated in FIG. 6 shows a reproduction of the object 32 at an image position 32c. Between the recording of the images 44b and 44c the vehicle 12 has moved further towards the vanishing point of the image so that the distance between the camera 17 and the object 32 has been further reduced between the recordings of the images 44b and 44c, and the object 32 is thus magnified and shifted further to the left edge of the image. Compared to the recording of the image 44b, in the recording of the image 44c the pitch angle of the vehicle 12 and hence the pitch angle of the camera 17 is changed so that the light beams emitted by the headlights 26 do not create a light/dark boundary at the position indicated by the broken line 34' but at a position indicated by the continuous line 35. Thus, a lifting of the light beams emitted by the headlights 26 and a shift of the light/dark boundary takes place so that other road users can be hindered thereby.

Figure 7:
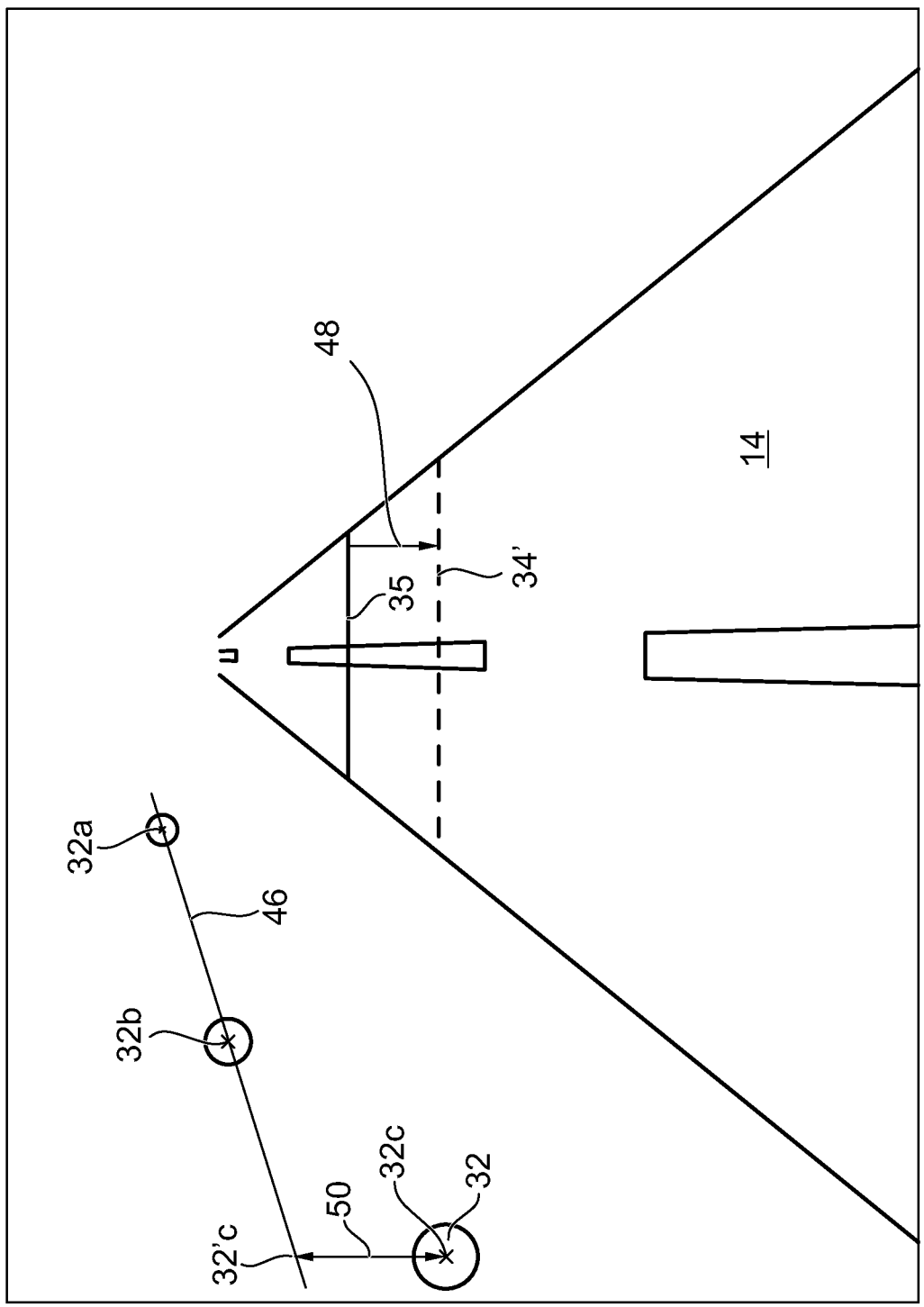
FIG. 7 is a schematic illustration of the course of the road and of a detected stationary object of the reproduction of FIG. 6, wherein, in addition, the image position of the reproduction of the object detected in the images of FIGS. 4 and 5 is identified and a straight line running through the image positions of the reproductions of the object of these images is entered.

In FIG. 7, the course of the road and of the light/dark boundaries 34', 35 of the image 44c as well as the object 32 are schematically illustrated. Further, the image positions of the object 32 of FIGS. 4 and 5 are illustrated each time by a schematic illustration of the object 32 at the respective image position 32a, 32b. Based on the image positions 32a, 32b, a straight line 46 has been determined. The straight line 46 preferably runs through the vanishing point of the image 44a. Without a change in the pitch angle of the vehicle 12 between the recording of the image 44b and the recording of the image 44c, the image position 32c of the object 32 would lie on the straight line 46. By the change in the pitch angle, the image position 32c has a distance 50 to the straight line 46 in y-direction of the image recording sensor. The y-direction of the image recording sensor runs parallel to the lateral image edges. Due to the change in the pitch angle of the vehicle 12 between the image recordings of the images 44b and 44c, the light/dark boundary generated by the light beams of the headlights 26 is located at the position 35 and not at the desired position 34'. Thus, a position correction corresponding to the illustrated displacement vector 48 has to take place for correction of the light/dark boundary from the position 35 to the position 34'. This is in particular possible with the aid of high-dynamically controllable headlights 26, i.e. headlights 26 having a short reaction time for changing the light distribution or the headlight range. Such headlights 26 can, for example, have LED arrays with individual LEDs that can be controlled row-wise and/or column-wise, wherein for setting the headlight range several LEDs are switched on and/or off, preferably complete LED rows are switched on and/or off. Other high-dynamic headlights can preferably have shutter shafts or shutters, which can be controlled relatively quickly.

Based on the distance between the expected desired position 32'c of the object 32 on the straight line 46 and the determined actual image position 32c of the object 32 in the image 44c, the distance 50 in y-direction of the x-y-image point matrix of the image recording sensor is determined. With the aid of this distance 50, then the change in the pitch angle can also be determined as an indication of degrees, wherein dependent on the distance 50 representing the change in the pitch angle or on the determined angle amount of the change in the pitch angle and the direction of the deviation 50 of the actual position 32c from the desired position 32'c a new light distribution to be created by the headlights 26 or a correction value for correcting the current light distribution of the headlights 26 can be determined.

Figure 8:
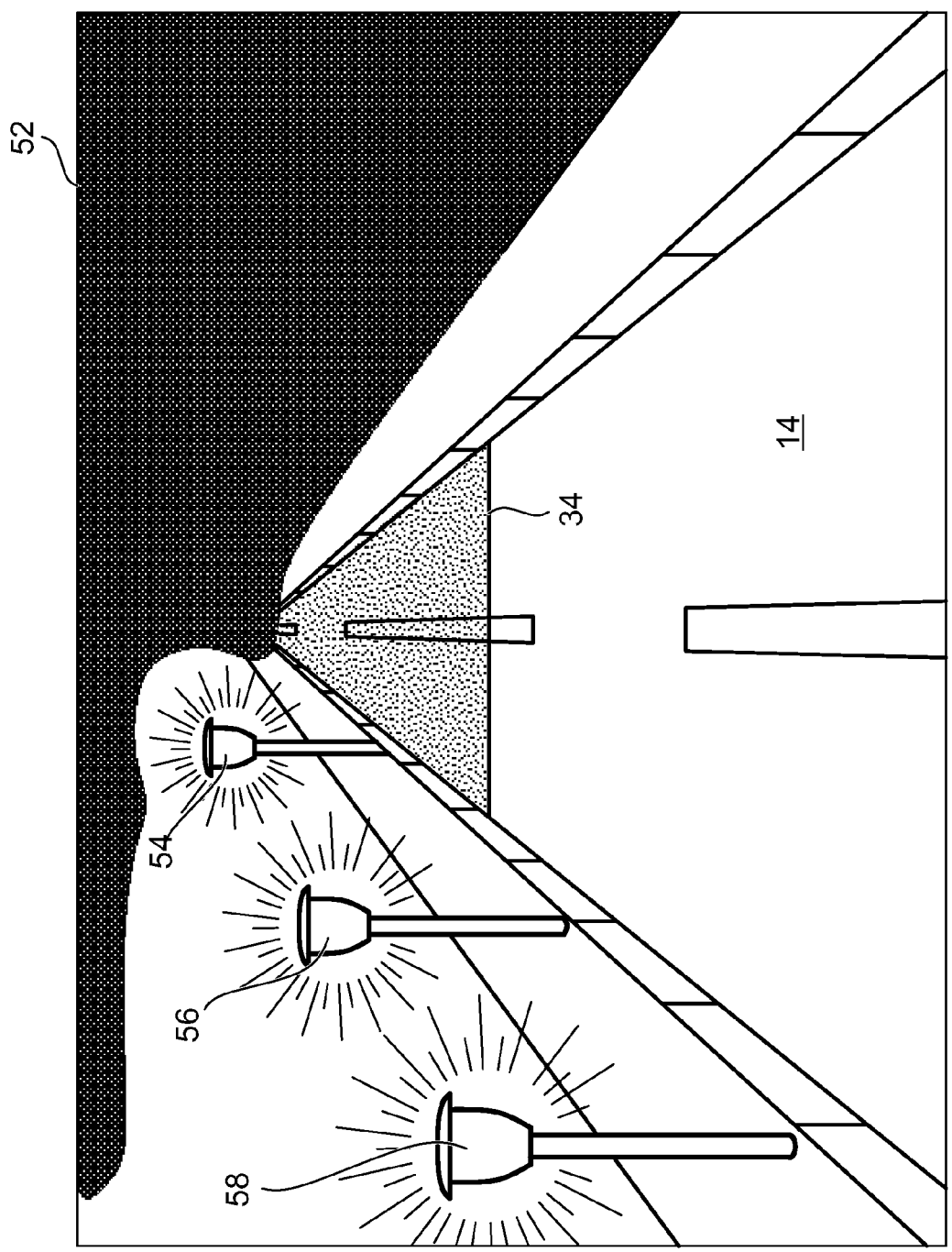
FIG. 8 shows a reproduction of an image recorded with the aid of the camera of the vehicle with reproductions of several stationary objects.

In FIG. 8, a reproduction of an image 52 with altogether three stationary objects 54, 56, 58 recorded with the aid of the camera 17 is shown. Further, a light/dark boundary 34 of the illumination of the area in front of the vehicle 12 generated by the light beams emitted by the headlights 26 is indicated by the continuous line 34.

Figure 9:
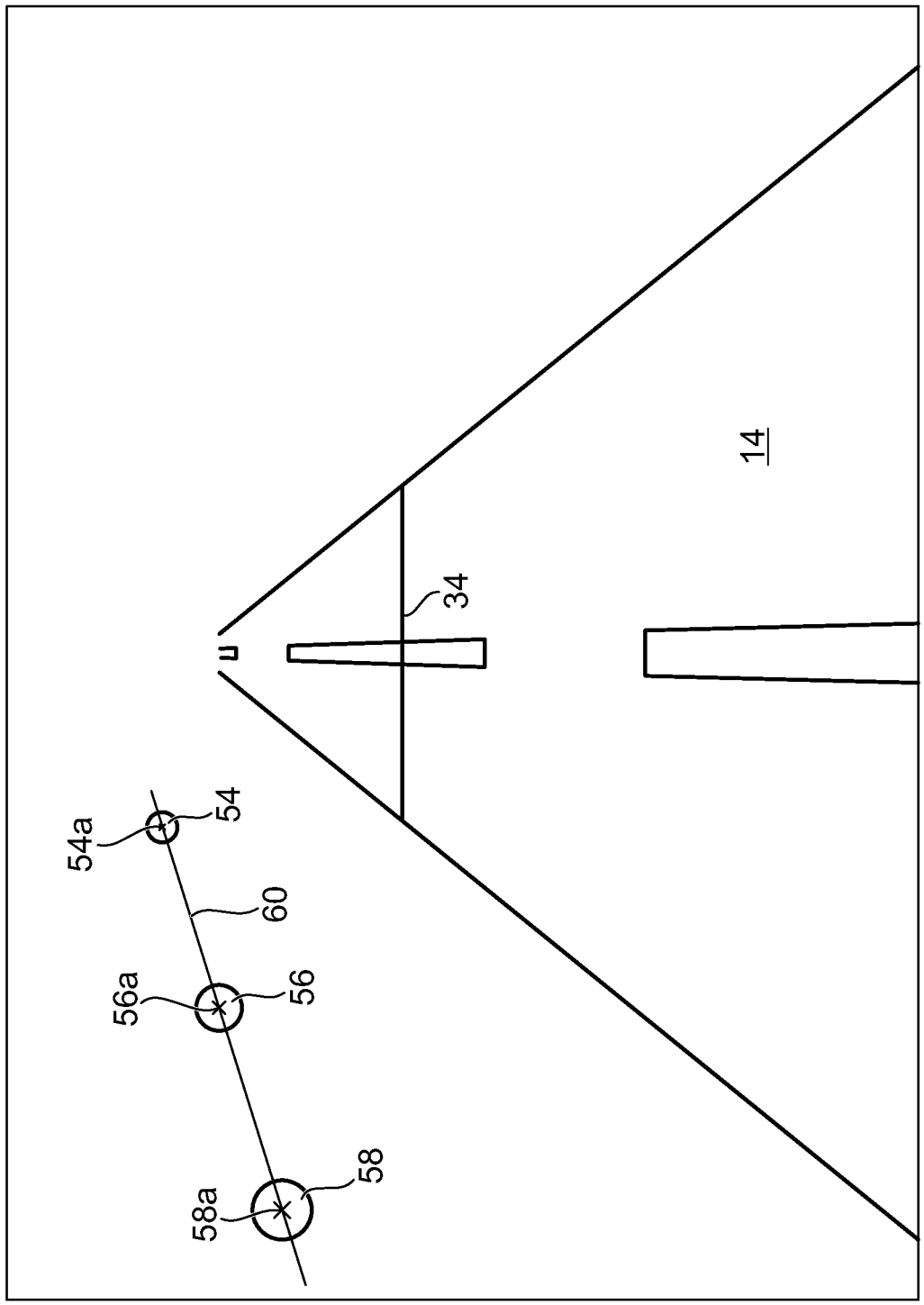
FIG. 9 is a schematic illustration of the course of the road and the image position of the reproductions of the three stationary objects according to FIG. 8 as well as a straight line running through the image position of these objects.

In FIG. 9, a simplified schematic illustration of the course of the road 14 and of several stationary objects 54 to 58 is illustrated. The image positions of the objects 54 to 58 are identified with the reference signs 54a, 56a and 58a. Based on the determined image positions 54a, 56a, 58a of the objects 54 to 58, the course of a straight line 60 is determined. The straight line 60 preferably runs through the vanishing point of the image 52.

Figure 10:
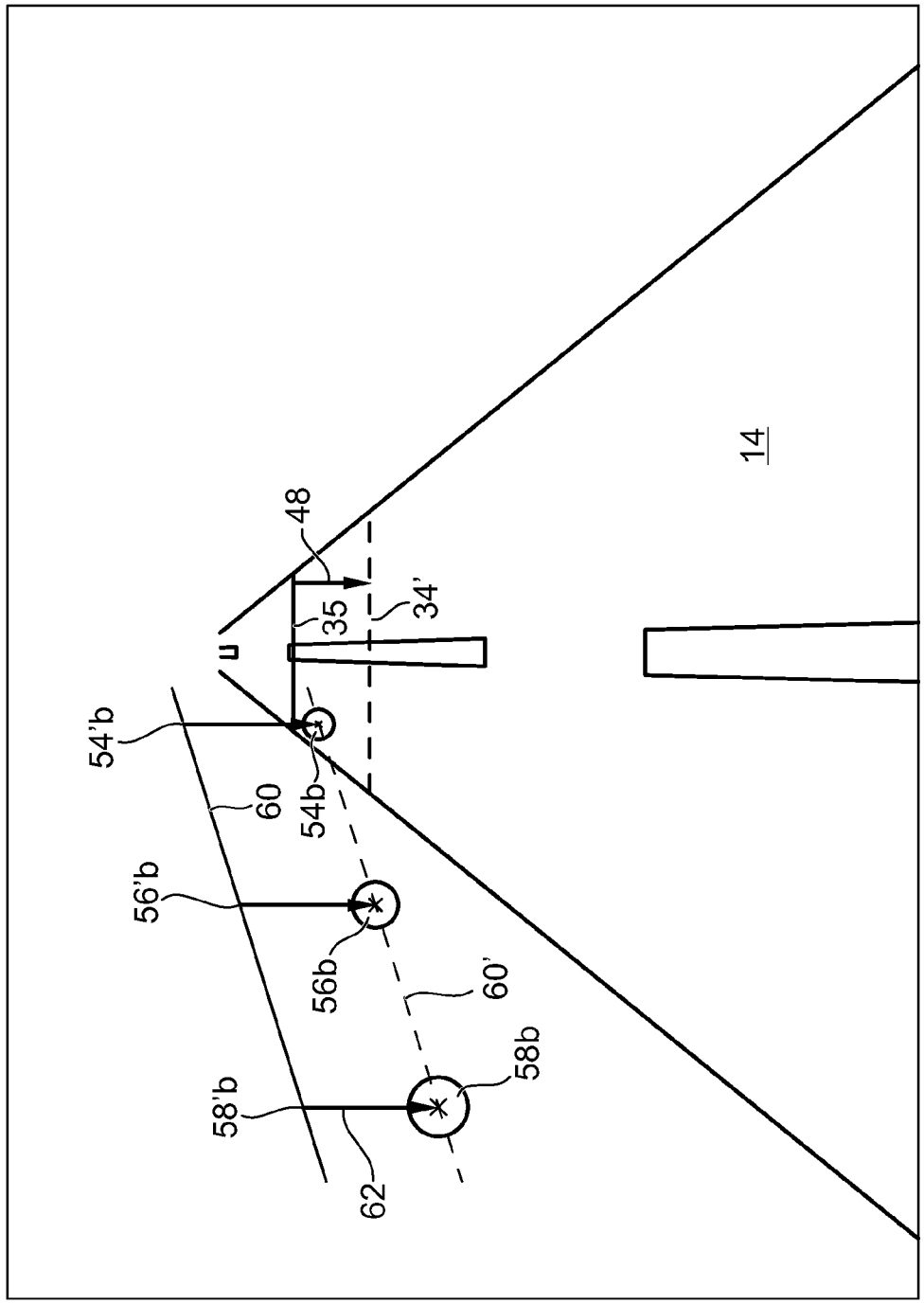
FIG. 10 shows the image positions of the reproductions of the objects according to FIG. 9 in a further image that is recorded with the aid of the camera of the vehicle but not illustrated, wherein between the recording of the image according to FIG. 8 and the recording of the image with the image positions of the reproductions of the objects according to FIG. 10, a change in the pitch angle of the vehicle with the image recording camera has occurred.

In FIG. 10, the simplified schematic illustration of the course of the road 14 as well as of the desired light/dark boundary 34' and the actual light/dark boundary 35 is illustrated. Further, the image positions 54b, 56b, 58b of the objects 54 to 58 determined in a further image (not illustrated) recorded after the image 52 according to FIG. 8 as well as the straight line 60 determined on the basis of the image positions 54a to 58a determined in the image 52 are illustrated. The actually determined image positions 54b to 58b deviate from the expected desired positions 54'b to 58'b as a result of the change in the pitch angle of the vehicle 12 and hence of the camera 17. The determined actual image positions 54b to 58b preferably lie on a common further straight line 60'. In a further processing step, the distance between the straight lines 60, 60' or the distance between the straight line 60 and a determined image position 54b to 58b of an object 54 to 58 or the averaged distance of the determined image positions 54b to 58b of the objects 54 to 58 in y-direction of the x-y-image point matrix of an image recording sensor of the camera 17 can be determined. The deviation of the image position 58b from the expected image position 58'*b* is indicated for the object 58 by the arrow identified by the reference sign 62.

Figure 11:
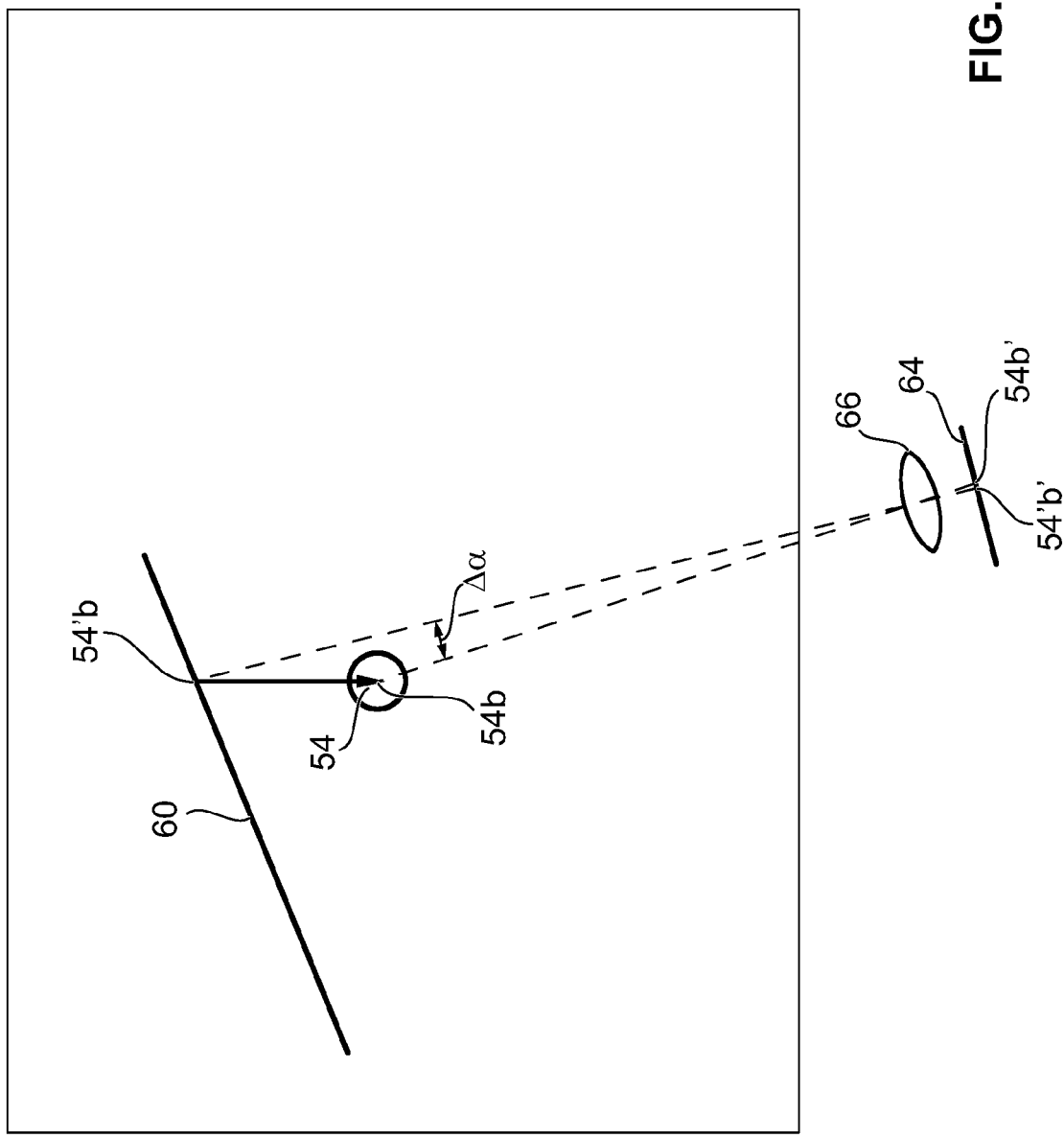
FIG. 11 is a schematic illustration of the visual lines between an image point matrix of the camera and the actual image position of the reproduction of the object and the expected image position of the reproduction of the object.

In FIG. 11, the image positions 54*b*, 54'*b* of the object 54 on an image recording sensor 64 are schematically illustrated. The image position 54*b* is identified as a position on the x-y-image point matrix of an image recording sensor 64 by the reference sign 54*b*' and the position of the image position 54'*b* is identified on the x-y-image point matrix of the image recording sensor 64 by the reference sign 54'*b*'. Between the image recording sensor 64 and the detection area of the camera 17, a camera optical system is arranged, of which the lens 66 that is close to the image plane is schematically illustrated in FIG. 11. In the principal plane of the lens 66, the image-side principal point of the optical system of the camera 17, i.e. of the camera optical system, is arranged. On the basis of the distance between the image-side principal point in the lens 66 and the image recording sensor 64 arranged in the image plane as well as of the distance between the image positions 54*b*' and 54'*b*' on the x-y-image point matrix, the change $\Delta\alpha$ of the pitch angle of the camera 17 can easily be determined. In the following, this is explained in more detail with reference to the schematic sectional illustration of the optical system of the camera 17 in connection with FIG. 12.

Figure 12:
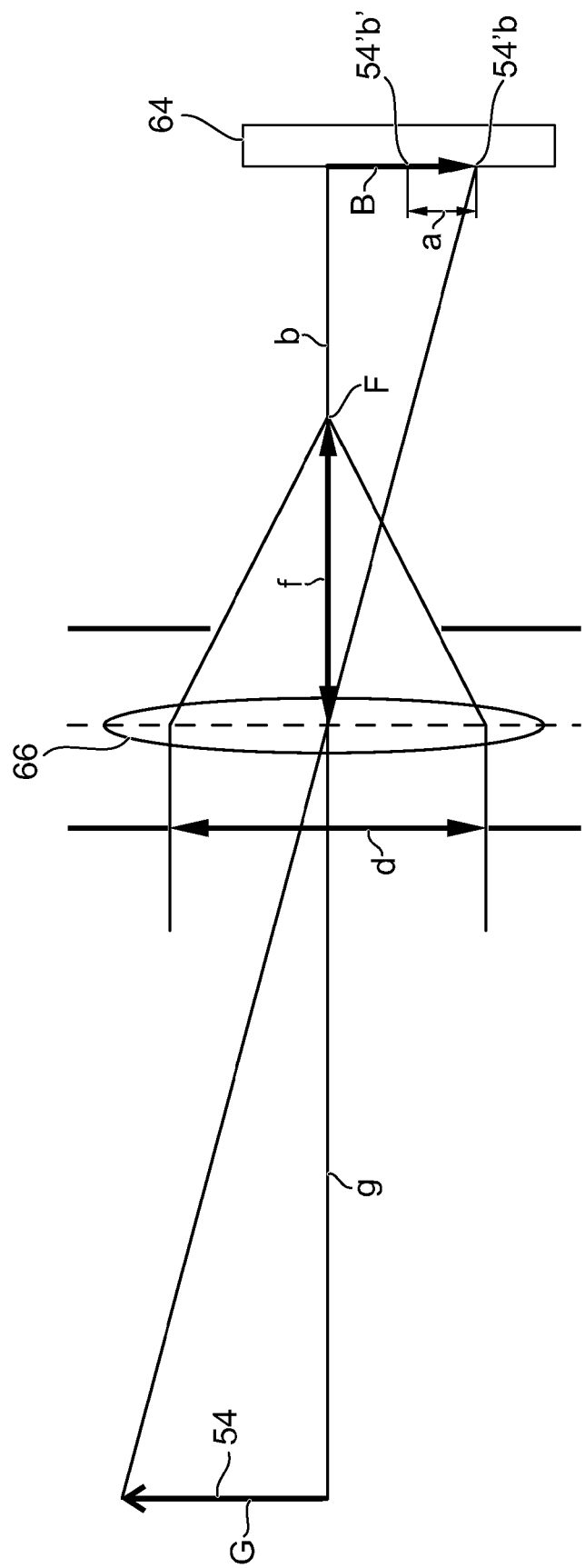
FIG. 12 is a simplified schematic illustration of the optical reproduction of an object on an image recording sensor.

The stationary object is imaged with the aid of the optical system of the camera 17, of which the image-close lens 66 is illustrated in FIG. 12, on the image recording area of an image recording sensor 64 formed as an image point matrix. Depending on the reproduction scale of the optical system of the camera 17, the image size B is many times smaller than the object size G of the stationary object 54. Merely exemplarily, the image positions 54*b*' and 54'*b*' indicate the shift of the image positions from the expected image position to an actually determined image position. The shift of the image positions from the expected image position to an actually determined image position occurred, as already explained, because of the pitch motions of the vehicle 12 and hence of the camera 17. On the basis of the distance between the image positions 54'*b* and 54'*b*' of the image distance b, the change $\Delta\alpha$ of the pitch angle can easily be determined, wherein the change in the pitch angle $\Delta\alpha$ can be determined at least sufficiently accurately according to the following equation:

$$\tan \Delta\alpha = a/b.$$

In FIG. 12, F is the focus, f is the focal distance, g is the object distance, and d is the diameter of the effective aperture. The variable k is the F-number and equals f/d. The variable m is the magnification and equals B/G.

Figure 13:
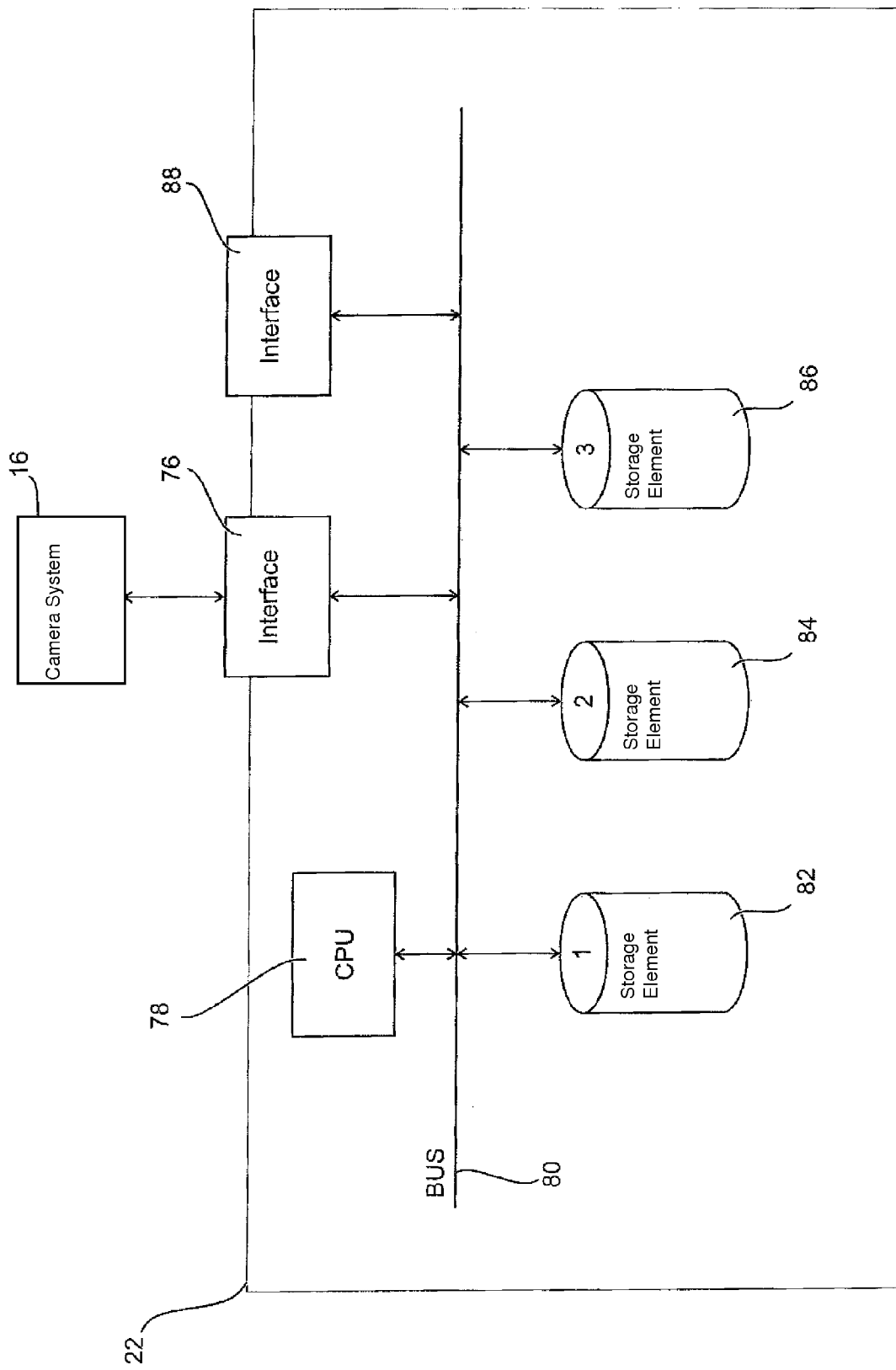
FIG. 13 is a block diagram with a processing unit for processing images recorded with the aid of the camera.

In FIG. 13, a block diagram with the processing unit 22 and the camera system 16 is shown. The processing unit 22 comprises a central processing unit (CPU) 78, a data bus 80 and three storage elements 82 to 86.

The processing unit 22 is connected to the camera system 16 via a first interface. Further, the processing unit 22 comprises a second interface 88 via which the data processed with the aid of the processing unit 22 can be output to other elements, for example the light control module 24. Preferably, the second interface 88 forms a connection to a vehicle bus system.

The CPU 78, the first interface 76, the second interface 88 and the storage elements 82, 84, 86 are connected to one another via the data bus 80. The image data corresponding to the images 44*a* to 44*c*, 52 generated with the aid of the camera system 16 are transmitted via the first interface 76 from the camera system 16 to the processing unit 22 as input data. The image data are stored in the first storage element 82. In the second storage element 84 of the processing unit 22, at least program data of at least one image processing program for determining the image positions 32*a*, 32*b*, 32*c*, 32*c*', 54*a*, 56*a*, 58*a*, 54*b*, 54'*b*, 56*b*, 56*b*', 58*b*, 58*b*' and the straight lines 46, 60, 60' are stored. Likewise, program data of a routine for determining a change in the pitch angle on the basis of the determined image positions 32*a*, 32*b*, 32*c*, 32*c*', 54*a*, 56*a*, 58*a*, 54*b*, 54'*b*, 56*b*, 56*b*', 58*b*, 58*b*' and of the straight lines 46, 60, 60' are stored in the second storage element 84.

The determined change in the pitch angle of the camera 17 between images sequentially recorded with the aid of the camera 17 is then used as a change in the pitch angle of the vehicle 12 in the control of the headlights 26 or as an input variable for the light control modules 24 and/or output via the second interface 88.

The invention has been described in connection with a mono camera. However, the invention can likewise be used in a stereo camera system. The invention is particularly characterized in that an object identified as a static object 32, 54 to 58 is tracked over several individual images of an image sequence, i.e. via so-called image frames, and the height deviations of the reproduction of the object 32, 54 to 58 from an expected height of the reproduction of the object 32 in a following image is determined, and on the basis of this deviation in height a change of the pitch angle of the camera 17 or, respectively, the vehicle 12 is determined. On the basis of the determined change in the pitch angle a correction of the light output of the vehicle 12 can be performed. As a result, it is possible to not affect other road users, in particular road users in oncoming vehicles and in vehicles driving ahead, and thus to not affect the traffic. If an object 32 has been identified as a static object 32, then its trajectory between several frames can be tracked and a straight line 46, preferably an epipolar line, can be determined. On this epipolar line, the object 32 moves forward in the direction of travel given a proper motion of the vehicle 12 or, respectively, of the camera 17, if no change in pitch angle occurs. When there is a change in the pitch angle, the determined actual image position of the object 32 does not lie on the epipolar line but is spaced therefrom. The proper motion of the vehicle 12 can further be transferred by the vehicle 12, preferably by a vehicle bus 80. In particular, the proper speed and the steer angle of the vehicle 12 can be taken into account and, if necessary, an image correction can be performed. The speed and steer angle of the vehicle can be measured by sensors or calculated by methods known in the art. Image correction using speed and/or steer angle can be performed using techniques known in the art. The determined pitch angle deviations can be separately determined for several detected stationary objects 54, 56, 58 and then be statistically evaluated in order to determine the actual change in the pitch angle as exactly as possible. With the aid of the determined change in the pitch angle, a correction of the light distribution of the light beams emitted by the headlights 26 can take place. As a result thereof, the light output of the vehicle 12 can be adapted to the changed pitch angle of the vehicle 12. In high-dynamic systems, in particular given a high-dynamic control of the headlights 26 of the vehicle 12, then a change in the pitch angle can be responded to at once so that other road users are not affected and a maximized illumination of the area is guaranteed without other road users being hindered.

On the basis of the course of changes in the pitch angle over several images, a prediction on the change in the pitch angle can be made as well, since the changes in the pitch angle generally have the course of an oscillation as a result of the suspension of the vehicle 12. As a result thereof, the setting of the headlights or, respectively, the setting of the light distribution of the headlights 26 can take place for the following image or for the following images at least while also taking into account the changes in the pitch angle predicted in this manner.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for determining a change in a pitch angle of a camera of a vehicle, comprising:
   sequentially recording at least three images, each of which includes a reproduction of a detection area in front of the vehicle, and the at least three images including at least a first image, a second image and a third image;
   wherein the camera is mounted in a fixed position at the vehicle and the vehicle performs a driving motion during the sequential recording of the at least three images;
   generating image data corresponding to each of the images; and
   processing the image data by:
     determining a first image position as a position of a first reproduction of a stationary object in the first image;
     determining a second image position as a position of a second reproduction of the stationary object in the second image;
     determining a course of a straight line based on at least the first image position and the second image position, the course of the straight line representing a current pitch angle of the camera;
     determining a third image position as a position of a third reproduction of the stationary object in the third image, the third image position spaced apart from the course of the straight line; and
     determining the change in the pitch angle of the camera from the current pitch angle of the camera based on a length of a line that extends between the third image position and a point on the straight line that is an expected position of the third reproduction of the stationary object in the third image were there no change in the pitch angle of the camera, wherein the line extends between the third image position and the point only along a Y-axis of an X- and Y-image point matrix of an image recording sensor of the camera.

2. The method according to claim 1, further comprising:
   recording at least a fourth image of the at least three images after recording the second image and before recording the third image; and
   determining a fourth image position as a position of a fourth reproduction of the stationary object in the fourth image; and wherein
   determining the course of the straight line includes determining the course of the straight line based on the first image position, the second image position and the fourth image position.

3. The method according to claim 1, further comprising:
   determining a course of a second straight line based on at least the first image position, the second image position and the third image position, the course of the second straight line representing a new pitch angle of the camera;
   recording a fifth image of the at least three images after recording the third image;
   determining a fifth image position as a position of a fifth reproduction of the stationary object in the fifth image; and
   determining a further change in the pitch angle of the camera based on a length of a line that extends between the fifth image position and a point on the second straight line that is an expected position of the fifth reproduction of the stationary object in the fifth image were there no further change in the pitch angle of the camera, wherein the line extends between the fifth image position and the point on the second straight line only along the Y-axis of the X- and Y-image point matrix of the image recording sensor of the camera.

4. The method according to claim 2 wherein at least one of the course of the straight line is approximated to the first, second and fourth image positions and the course of the straight line runs through at least one of the first, second and fourth image positions.

5. The method according to claim 1 wherein the course of the straight line is determined with the aid of a displacement vector of image positions between at least two of the at least three images.

6. The method according to claim 5, further comprising:
   determining one displacement vector of the image positions each time between at least two image pairs of two sequentially recorded images of the at least three images; and
   determining an average displacement vector using each of the displacement vectors;
   wherein the average displacement vector is used to determine the course of the straight line, a first image pair comprises the first image and the second image, and a second image pair comprises the second image and a fourth image recorded between the second image and the third image.

7. The method according to claim 1 wherein at least the first image, the second image and the third image include a reproduction of a second stationary object, the method further comprising:
   determining image positions of the reproduction of the second stationary object in each of the first image, the second image and the third image;
   determining a first course of the image positions of the reproduction of the second stationary object between the first image and the second image;
   determining a second course of the image positions of the reproduction of the second stationary object between the second image and the third image;
   determining a third course of the first image position and the second image position between the first image and the second image;
   determining a fourth course of the second image position and the third image position between the second image and the third image; and
   determining at least one displacement vector between the first and second courses and between the third and fourth courses; and wherein the course of the straight line is determined based on the at least one displacement vector.

8. The method according to claim 1 wherein an X-axis of the X- and Y-image point matrix runs parallel to a Y-axis of a vehicle coordinate system or the X-axis is at a preset angle with respect to the Y-axis of the vehicle coordinate system.

9. The method according to claim 1 wherein the change in the pitch angle Δα is determined according to the following equation:

tan Δα=a/b; wherein a is the length of the line between the third image position and the point; and b is the distance between an image plane and an image-side principal point of a camera optical system of the camera.

10. The method according to claim 1, further comprising:
determining a steer angle of the vehicle between sequential image recording of at least two images of the at least three images; and
correcting an image position in at least one of the at least two images using the steer angle of the vehicle.

11. The method according to claim 1, further comprising:
determining at least one of light distribution to be set for at least one headlight of the vehicle based on the change in the pitch angle of the camera and a correction value for correction of the light distribution of the at least one headlight of the vehicle.

12. The method according to claim 1 wherein the camera is a monocular camera.

13. The method according to claim 1 wherein the stationary object comprises at least one of a light source of a street light, a light source of a traffic signal facility, a light source of a traffic sign illumination, an object illuminated by a light source and reflecting at least part of a light of the light source, a traffic sign and a traffic management system.

14. The method according to claim 13, further comprising:
determining whether the light source has brightness fluctuations as a result of an energy supply by a power grid with a power frequency of 50 Hz or 60 Hz; and
classifying the light source as the stationary object.

15. A device for determining a change in a pitch angle of a camera of a vehicle, the camera sequentially recording at least three images, each of which includes a reproduction of a detection area in front of the vehicle and generates image data corresponding to each of the images, the at least three images including at least a first image, a second image and a third image, the device comprising:
a processing unit for processing the image data and configured to:
determine a first image position as a position of a first reproduction of a stationary object in the first image wherein the at least three images are sequentially recorded while the vehicle performs a driving motion and the camera is mounted in a fixed position at the vehicle;
determine a second image position as a position of a second reproduction of the stationary object in the second image;
determine a course of a straight line based on at least the first image position and the second image position, the course of the straight line representing a current pitch angle of the camera;
determine a third image position as a position of a third reproduction of the stationary object in the third image, the third image position spaced apart from the course of the straight line; and
determine the change in the pitch angle of the camera from the current pitch angle of the camera based on a length of a line that extends between the third image position and a point on the straight line that is an expected position of the third reproduction of the stationary object in the third image were there no change in the pitch angle of the camera, wherein the line extends between the third image position and the point only along a Y-axis of an X- and Y-image point matrix of an image recording sensor of the camera.

16. The device according to claim 15 wherein the change in the pitch angle Δα is determined according to the following equation:

tan Δα=a/b; wherein a is the length of the line between the third image position and the point; and b is a distance between an image plane and an image-side principal point of a camera optical system of the camera.

17. The device according to claim 15 wherein the at least three images are represented on an X- and Y-coordinate plane; and wherein the processing unit is configured to:
control headlights of the vehicle so that a light and dark boundary on a driving surface in the at least three images changes position along an Y-axis of the X- and Y-coordinate plane based on the change in the pitch angle.

18. The device according to claim 17 wherein the processing unit is configured to:
predict the change in the pitch angle based on a plurality of previously-determined changes in the pitch angle; and
use the predicted change to control the headlights while determining the change in the pitch angle of the camera.

19. The method according to claim 1, further comprising:
determining the expected position of the third reproduction of the stationary object in the third image, based on the course of the straight line, were there no change in the pitch angle of the camera from the current pitch angle of the camera.

20. The method according to claim 1 wherein the at least three images are represented on an X- and Y-coordinate plane, the method further comprising:
predicting the change in the pitch angle based on a plurality of previously-determined changes in the pitch angle;
using the predicted change to control headlights of the vehicle so that a light and dark boundary on a driving surface in the at least three images changes position along an Y-axis of the X- and Y-coordinate plane while determining the change in the pitch angle of the camera.

* * * * *